Oct. 1, 1968  D. J. GRIFFITHS  3,404,250

WELDING APPARATUS

Filed July 1, 1966  7 Sheets-Sheet 1

INVENTOR.
DEREK J. GRIFFITHS
BY
Christie, Parker + Hale
ATTORNEYS

FIG_2_

FIG_5_

FIG_6_

INVENTOR.
DEREK J. GRIFFITHS
BY
ATTORNEYS.

INVENTOR.
DEREK J. GRIFFITHS.
BY
Christie, Parker & Hale
ATTORNEYS.

FIG_11_

FIG_12_

FIG_13_

United States Patent Office 3,404,250
Patented Oct. 1, 1968

3,404,250
WELDING APPARATUS
Derek J. Griffiths, Arcadia, Calif., assignor to Unitek Corporation, Monrovia, Calif., a corporation of California
Continuation-in-part of application Ser. No. 441,021, Mar. 19, 1965. This application July 1, 1966, Ser. No. 564,493
12 Claims. (Cl. 219—81)

ABSTRACT OF THE DISCLOSURE

An automatic welding machine for completing a plurality of interconnections between electronic components. The machine utilizes a detector operatively linked to an adjustable welding program for controlling the travel of the welding electrodes. At suitable intervals a predetermined position is detected corresponding to the presence of a connection to be made. At this position a signal is generated energizing a force transducer and subsequently causing a pulse of energy to be transmitted to a pair of welding electrodes. Both roller electrodes and conventional parallel gap electrodes are contemplated. The work table of the machine is capable of both X and Y directional movement for complete flexibility in applying interconnections at any point in the area covered by the welding electrodes.

---

This application is a continuation-in-part of application Ser. No. 441,021, filed Mar. 19, 1965, now abandoned.

This invention relates to an apparatus for making electrical connections and, in particular, to an automatic machine for use in welding and soldering electronic components to printed circuit boards.

With the advent of micro-electronics and integrated circuit packaging, a need for a tool capable of performing high volume, high quality interconnections between electronic components and connecting circuitry has developed. In answer to this need, conventional welding machines have been redesigned to be connected to and operated by paper or magnetic tape programmers which supply instructions to the welding machine in a manner similar to the way in which automatic machine tools are operated.

Programmed welding machines normally require a substantial amount of peripheral equipment, i.e., tape readers and the like in order to read the program on the tape and translate it into signals utilizable by the welding machine. Inherent in this method of operation is the need for a complete individual program for each welding configuration to be used with the equipment. On each occasion when the configuration is changed, even in the case where the change is as simple as increasing or decreasing the number of components to be connected to the board, a new program conforming to the new requirements must be available and be substituted into the peripheral supporting equipment.

Another problem frequently encountered in the use of automatic welding machines is that of fouling of the electrodes necessitating frequent stopping of the machine's operation to permit removal and cleaning or replacement of the electrodes. The high energies involved in such welding operations normally produce significant heating of the weld area frequently causing the epoxy or other surface material on the printed circuit board to boil up into the weld location and become deposited on the electrodes.

The present invention provides an apparatus for connecting the leads of electronic components. The apparatus comprises a work table with power supply, a first support, and a second support for the components, all mounted on the work table. A pair of electrodes are mounted on the first support and are electrically connected to the power supply. Means are provided for moving the electrodes and second support relative to one another in two transverse directions. Means are also provided for establishing electrical contact between the electrodes and the component leads to be connected. Finally, means are provided for adjusting the amount of force exerted by the electrodes on a lead to be connected subsequent to establishing contact between the electrodes and the lead.

The means for adjusting the force exerted by the electrodes provide a means for obtaining the desired force on the leads to be connected. In the operation of machines of this type a finite increment of time is necessary to allow the work table to "settle" as the machine positions each connection location in place beneath the electrodes. In operation the electrodes are first brought into contact with the leads and by such means as a force transducer or a spring and solenoid arrangement the electrodes are subsequently caused to bear on the leads with increasing force until the desired pressure is achieved. When the electrode pressure has been increased to its optimum value, the sequenced operation of the welding machine of this invention causes a pulse of energy to be delivered from the power supply to the connection location.

In a preferred embodiment of the present invention photo-electric programming means are provided which add a significant measure of flexibility to the operation of the present invention in that the program used can readily be modified to adapt to different weld or connection configurations. The programming means comprises a light source, a photoelectric cell and program mask interposed between the source and cell. Preferably the program mask is disposed on the second support adjacent the area upon which the components to be welded are disposed. The program mask consists of an appropriate arrangement of translucent and opaque areas. By moving the mask between the light source and photocell, the machine can be sequenced such that when a translucent portion corresponding to the positioning of a weld location beneath the electrode passes between the source and cell, the travel of the table is stopped, proper electrode pressure is established, a welding pulse is delivered, electrode pressure is decreased and the table travel reinitiated until a subsequent translucent portion passes between the source and the cell. By placing or removing opaque material from translucent areas on the mask, the weld program can be easily modified without the necessity of substituting a completely new program.

A further improvement in the machine of the present invention is the provision of a liquid reservoir and means for delivering a charge of liquid to a point between the weld electrodes just prior to energization of the electrodes with the welding pulse. The effect of "wetting" the weld location is to provide good electrical contact and a heat sink effect at the weld thereby preventing epoxy boilup from the printed circuit board. A new method is thereby provided for keeping the electrodes clean, reducing the need for removal or replacement.

The invention also lends itself to use with roller electrodes. By virtue of the rolling motion which can be imparted to these electrodes as the second support and electrodes move relative to one another to thereby carry the leads of the components under the roller electrodes, the electrodes can be held continually in one position for a sequence of welds. As each lead to be connected comes in contact with the roller electrodes, the rolling motion is stopped, the pressure exerted by the electrodes on the leads is increased to a suitable value and the electrodes are energized by the power supply so that the lead of one component is resistance welded or reflow soldered to the lead of a second component with which it is associated. Conecting in this manner permits up to 300 connections per minute to be made. While also useful in making connections by other techniques, i.e., reflow soldering, the descriptions herein will be directed to the application of the apparatus of the present invention to the technique of making resistance welded connections.

These and other features of the automatic welding machine of this invention will be more readily understood by reference to the following figures and accompanying description.

FIG. 7 is a view showing various control components of the welding machine;

Figures 1, 3:
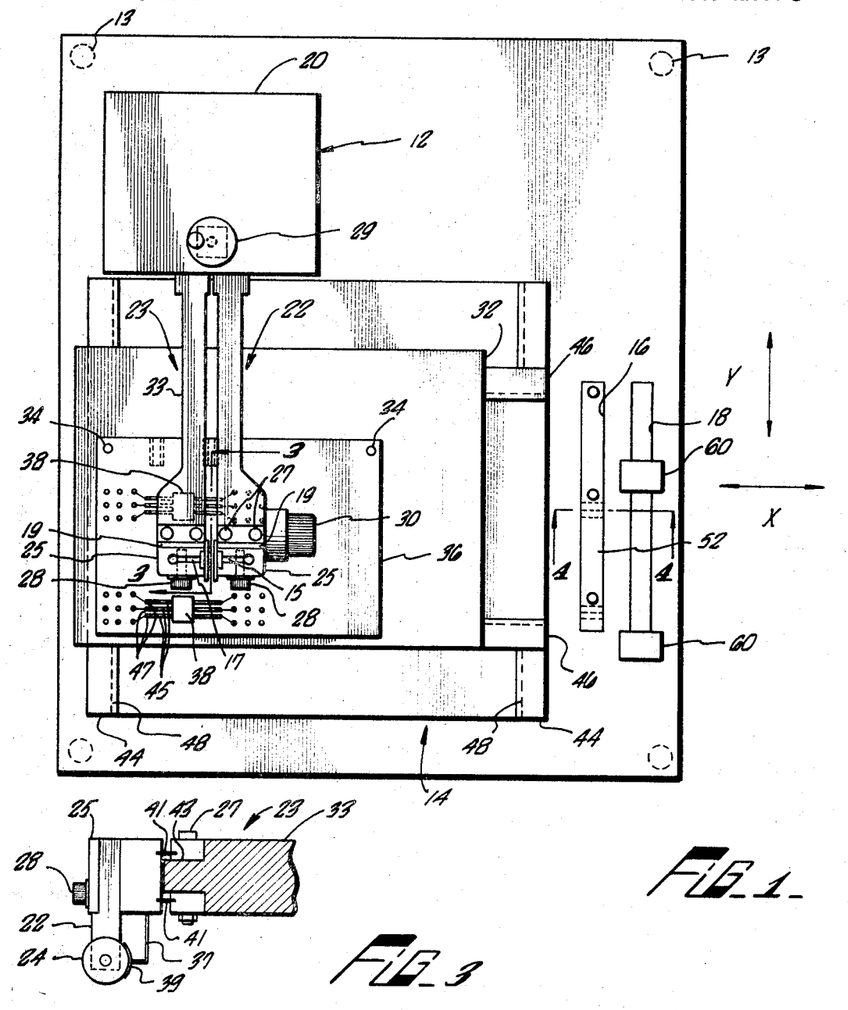
FIG. 1 is a plan view of one embodiment of the welding machine of this invention.
FIG. 3 is a partial sectional view taken along lines 3—3 of FIG. 1.
Figure 1:
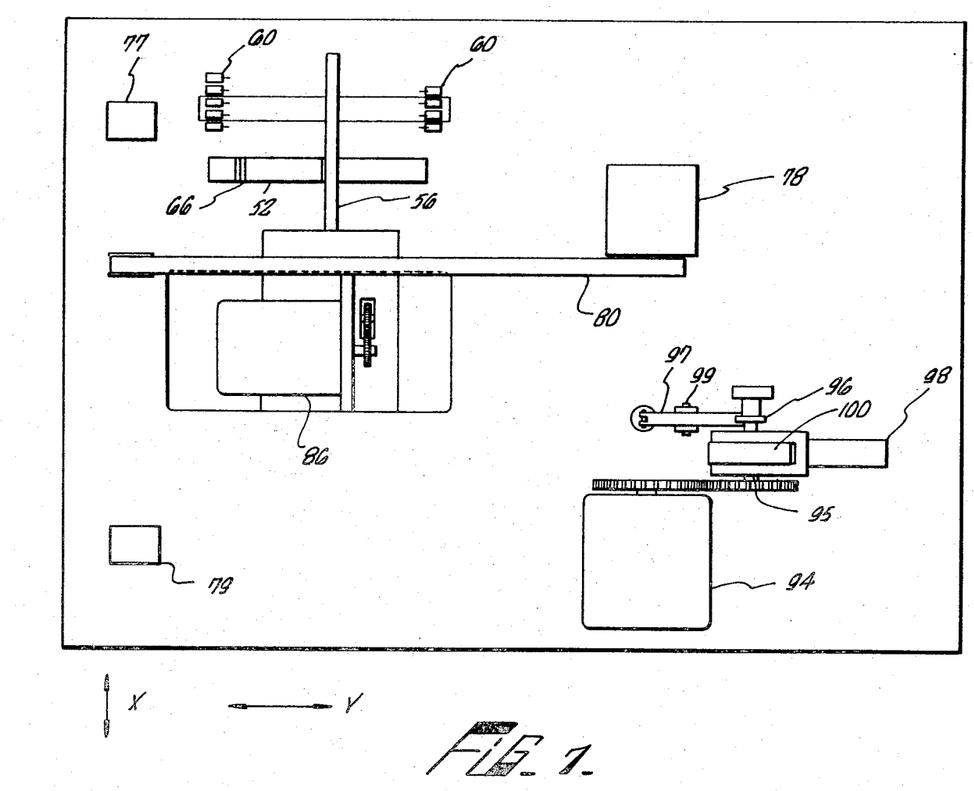
Figure 2:
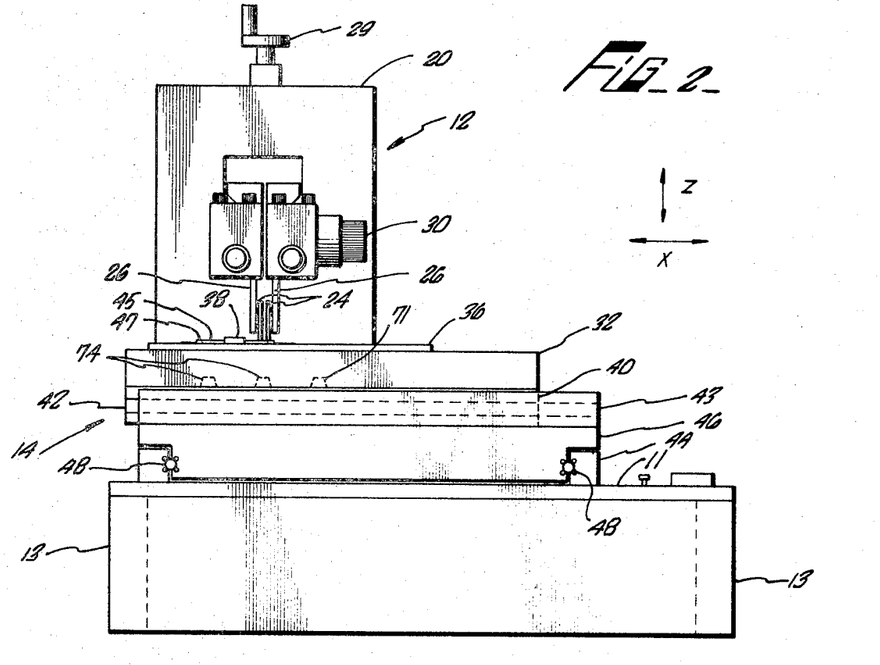
FIG. 2 is a front elevation of the same embodiment.

Referring now to FIGS. 1 and 2, there is shown a welding unit comprising a weld head 12 and a work table 14. The table is supported on legs 13. The weld head 12 comprises a housing 20 containing a pair of vertical raceways (not shown). A pair of electrodes holders 22 and 23 are mounted on the raceways. The electrode holders extend out over the work table 14 to a position above integrated circuit flat packs and printed circuit boards to which the packs are to be welded. Supported by the electrode holders 22 and 23 are a pair of roller electrodes 24 which are held in position by self-aligning electrode supports 26. The supports 26 are positioned by being inserted into slots 15 and 17 in electrode holders 22 and 23, respectively. Allen screws 28 are then tightened to lock the transports in place. Four fixing screws 27 are mounted on top of the electrode holders to the rear of slots 19. As will be described in more detail in conjunction with FIG. 3, these are used to flexibly secure tip portions 25 to the main portion 33 of each electrode holder. Mounted on the outside of electrode holder 22 is a control knob 30 for adjusting the gap between the roller electrodes. In the usual embodiment, the electrodes can be spaced from 0 to 40 mils apart. The choice of spacing depends on the thickness and composition of the leads of the components to be welded.

Provided at the top of the weld head 12 is a control knob 29. This knob controls an adjustable tensioning means (not shown) such as a spring and solenoid within the weld head which in turn controls the amount of pressure exerted by the roller electrodes on the leads to be welded. Upon transmission of a single from the programming means the solenoid releases the spring causing it to exert pressure on the electrodes and in turn on the leads to be welded. It has been found that one of the factors involved in obtaining a high quality weld is the pressure which the electrodes exert on the leads to be welded. For example, four to five pounds per square inch has been found to be the optimum pressure in the welding of flat packs to printed circuit boards.

As shown herein a preset force is selected by means of control 29. This force is cancelled by the solenoid until it is energized. When the automatic cycling begins and a signal is transmitted to the solenoid, the electrodes are lowered into contact with a printed circuit board and bear against the board with the desired force. Before actuating the roller electrodes are set to exert a small pressure (approximately ½ lb.), on the board until the solenoid is energized. When contact with a lead is established and the steady-state condition of the table achieved, the pressure is increased to the optimum, held at this value during welding and then released. In this way the possibility of cracking or crazing of the substrate is diminished.

In FIG. 3, a partial sectional view along lines 3—3 of FIG. 1 are shown along with the details of the front portion of electrode holder 23. The holder is seen to consist of two parts, a front tip 25 and a main portion 33. In the front of tip 25 is shown a compressible slot 17 in which self-aligning electrode support 22 is locked by means of an Allen screw 28. Roller electrode 24 is mounted on the electrode support 22. A support 37 depends from tip 25 and mounted thereon is a shoe 39 engaging a portion of the electrode surface. Shoe 39 illustrates one way in which means for cleaning the electrode surface is provided to insure presentation of a clean electrode surface at each weld.

Tip 25 has two thin metallic strips 41 which are brazed at one end to the tip and at the other end to the main portion 33 of holder 23. These strips are arranged such that a small amount of clearance is provided between them and a neck 49 extending from main portion 33. Tip 25 and neck 49 are held in position relative to one another by fixing screw 27. This tip configuration provides a small amount of compliancy in each of the electrode tips so that each of the roller electrodes can compensate for the tolerance variations in the leads and substrate as the roller electrodes pass over them.

The work table 14 comprises a work vise 32 which is provided with a pair of mounting pins 34 for holding a printed circuit board 36 in position during a welding operation. Disposed on top of the printed circuit board 36 are two integrated circuit flat packs 38. A plurality of leads 45 extend from both sides of the flat pack and are brought into physical contact with corresponding leads 47 on the printed circuit board. The vise 32 is disposed upon supports 40 which includes a wire-rod ball bearing raceway 42. A conjugate raceway 43 mounted at the top of a second pair of supports 46 mates with raceway 42. This raceway gives the work platform the capability of moving the work piece in the "X" direction. Supports 46 are held in position by means of a pair of supports 44 which form an integral part of the main platform 11 of the work table 14. Supports 46 are mounted on supports 44 by means of a second pair of wire-rod raceways 48. Raceways 48 give the capability of motion in the "Y" direction.

In this embodiment two slots in the main platform 11 are provided adjacent the work table. The first slot 16 is adapted to receive a programming strip 52 for providing the means for energizing the roller electrodes as they come in contact with each successive lead to be welded. Strip 52 is adjustable in its slot for precise alignment with the various leads to be welded. A second slot 18 is provided adjacent to slot 16. Two adjustable electrical stop contacts 60 are mounted in slot 18 and are positioned along the slot at the points of extreme traverse of the work table in the "Y" direction.

Figure 4:
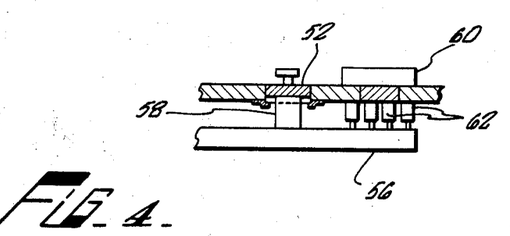
FIG. 4 is a partial sectional view taken along lines 4—4 of FIG. 1.

FIG. 4 illustrates in greater detail the relationship of the stops 60, the stop contacts 62, an arm 56 extending from the work table to a position between the stop contacts, program strip 52, and weld head actuation contact 58. Contact between arm 56 and the contacts 62 causes dynamic braking and reversal of the motor which drives the work take in the "Y" direction. Engagement of contact 58 and grooves (not shown) in strip 52 completes an electrical circuit to the welding power supply (see FIG. 8) and initiates current flow between the electrodes to produce a resistance weld.

Figure 5:
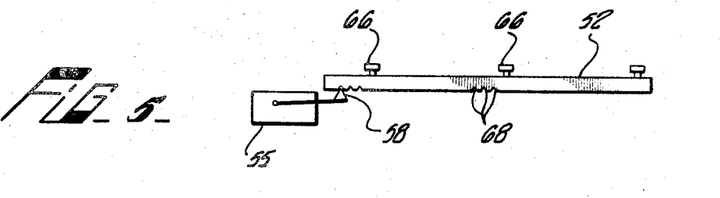
FIG. 5 is a detail of a programming index for actuation of the electrodes.

The weld head program strip 52 is depicted in FIG. 5. This strip is a flat bar of metal provided with a plurailty of serrations 68 along one surface. Mounted on top of the strip is a series of locking screws 66 for holding the strip in position. The serrations shown correspond to the lay-out of the circuit board and flat pack of FIG. 1. When mounted, the strip 52 is positioned such that the serrations are physically aligned with the leads to be welded. When contact 58 from a microswitch 55 mounted on the work table extension engages a serration, current flow is initiated as described above. The serrated programming strip in FIG. 5 indicates only one embodiment of numerous possible indexing means which can be employed with the machine of this invention in order to obtain firing of the electrodes when a weld is required. Other possibilities include the use of a photoelectric programming means (see FIGS. 9 and 10) in place of switch 55 and contact 58. A second alternative is to provide a fibre optic cell mounted on the electrode supports extending down into the electrode gap.

Figure 6:
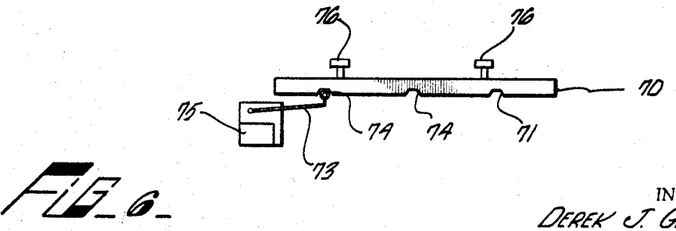
FIG. 6 is a detail of programming index for controlling the travel of the work table.

In FIG. 6 is depicted a second strip 70, this strip being used for programming the traverse of the work table in the "X" direction. Strip 70 is a flat metal bar and is provided with one or more notches 74 in one surface. As in FIG. 5, the notches in strip 70 represent the positions for locating the leads of the circuit board and flat packs in FIG. 1 in a second direction relative to the electrodes and are engaged by contact 73 from microswitch 75. As shown, the strip is removable and is locked in position by means of locking screws 76. It may also be provided as a permanent part of the table. Other programming or indexing means are also possible for performing this function.

The operation of the welding machine of this invention will be described in conjunction with the description of FIG. 7. To prepare the machine for operation, the programming strips are mounted at their respective locations and the circuit board placed on the work table. The plurality of flat packs which are to be welded to the circuit board are disposed in proper position on top of the board. The main power switch 77 is then actuated for supplying power to the various electrical motors and other components of the machine.

When operation is ready to commence, switch 79 is operated and the following sequence takes place. A head actuating motor 94 is energized and begins to rotate causing rotation of shaft 95 and a cam 96 mounted on shaft 95. Operation of the cam causes a turning of cam follower 97 about its pivot 99 and the weld head is lowered until the electrodes are in contact with the printed circuit board. At this point, solenoid 98 is energized and holds the head in the lowered position by means of brake 100.

With the weld head in position the "Y" traverse motor 78, also referred to as the table feed motor, is actuated and begins to rotate, driving timing belt 80 and causing the table to begin to move relative to the electrodes thereby bringing the leads to be welded beneath the roller electrodes. As platform extension 56 comes abreast of a serration 68 in the programming strip 52 and a contact engages the serration, the motor 78 is stopped and the electrodes allowed to come to rest at a position centered on the lead to be welded. By means of a suitable delay built into the sequencing operation, a time lapse is provided to allow the table to "settle." Subsequent to the delay a signal to the solenoid in the weld head causes it to operate releasing a spring and causing the electrodes to bear on the leads with the desired weld pressure. A circuit between the power supply and the electrodes is closed and power supplied to the roller electrodes, causing current to flow between the electrodes and resistance welding of the leads. The solenoid current is then cut off releasing the increased electrode pressure and the table again begins to feed in the "Y" direction until the contactor on extension 56 encounters another serration or the stop contact 60 is engaged. When contact 60 is engaged, the table feed motor 78 is stopped, head actuator motor 94 is energized, and solenoid 98 de-energized. Operation of the head actuator motor causes the electrodes to be raised from the circuit board.

At this point the table traverse motor 86 is energized causing the work platform to shift in the "X" direction to a position aligning a second set of leads to be welded with the location of the roller electrodes. When the second notch in the traversing programming strip is encountered, motor 86 is de-energized. Head actuator motor 94 has completed one revolution during this interval and rotation of the cam again lowers the head until the roller electrodes are in contact with the printed circuit board. Table feed motor 78 is then actuated and the work table begins to feed again in the "Y" direction. If the previous direction of travel is considered the positive "Y" direction, the direction of travel now is in the negative "Y" direction. Again, as the leads are encountered, the electrodes are energized. When all leads have been welded, the platform extension 56 encounters the second stop contact 60 and the sequence repeated until the last lead is welded.

Additional flat packs, if present, in an adjacent row or rows are welded according to the preceding sequence. When, as in FIG. 1, there are only two rows of leads to be welded, the second engagement of stop contacts 60 causes the table traverse motor 86 to be energized, shifting the table to a load position removed from the electrodes to facilitate removal and replacement of printed circuit boards and/or components to be welded. The machine is also programmed to recognize that the welding sequence for that particular circuit board is over and it shuts itself off.

Figure 8:
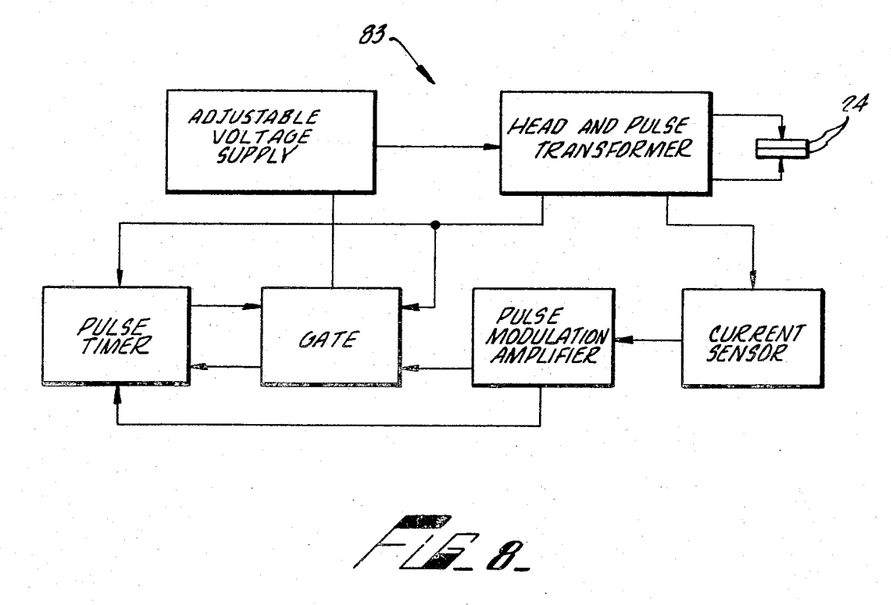
FIG. 8 is a block diagram of a power supply for use with the welding machine of this type.

FIG. 8 depicts a block diagram of a power supply 83 for use with welding machine of this invention. The supply is described in greater detail in copending application Ser. No. 389,901, filed Aug. 17, 1964. The supply is connected to the electrodes 24 in response to completion of the circuit when the actuation contact 58 engages a serration 66 on the programming strip 52.

Figure 9:
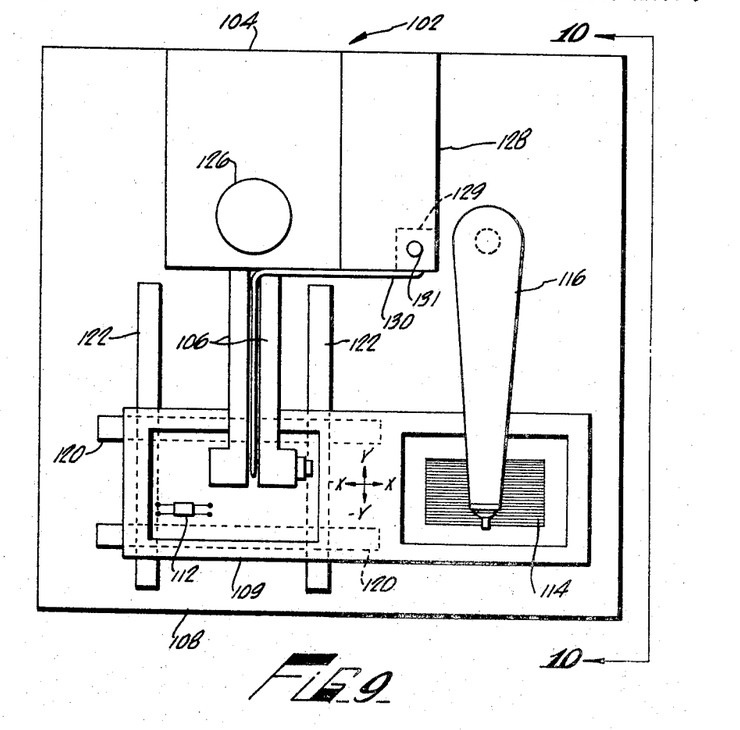
FIG. 9 is a plan view of a preferred embodiment of the present invention utilizing photoelectric programming means for controlling the welding operation.
Figure 10:
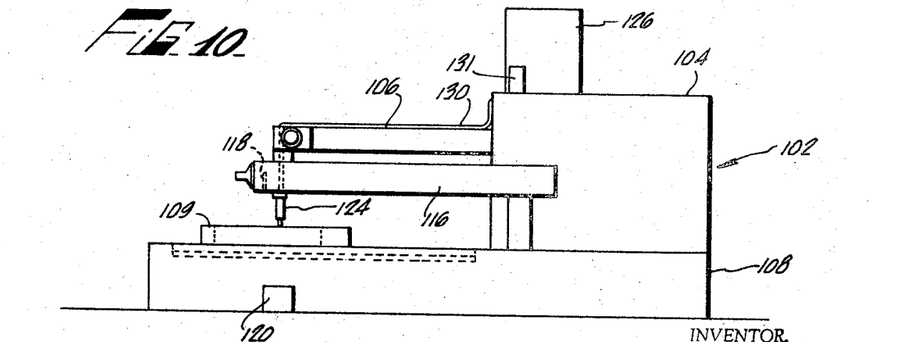
FIG. 10 is a view taken along lines 10—10 of FIG. 9.

A preferred embodiment of the automatic welding machine of the present invention is shown in FIGS. 9 and 10. Shown therein is an automatic welder 102 comprising a weld head 104 housing the welding power supply. A pair of electrode supports 106 extend from the weld head out over a work table 108 which is adapted to support a positioning table 109 and the eletcronic components to be welded. As in the previous embodiment such components are typically a printed circuit board 110 and one or more integrated circuit flat packs 112 which are to be welded or soldered to the printed circuit board.

On an extension of positioning table 109 located adjacent to the circuit board is a program mask 114 disposed beneath an arm 116 in which is housed one or more photoelectric cells 118. Preferably two photocells are used, the photocells being slightly offset and spaced with respect to one another. The use of two photocells aids in obtaining centering of the electrodes with respect to the leads to be connected. A light source 120 is disposed beneath table 109 such that light from the source is directed through a portion of the program mask 114 toward photocell 118. When light is transmitted through a translucent portion of the mask 114, a signal from the photocell is transmitted to the weld head 104 to cause the machine to go into a welding sequence. The welding sequence of the present embodiment will be described in greater detail in conjunction with FIG. 14.

The program mask as shown in FIG. 9 is a sheet of material such as photographic negative having a grid of opaque lines extending horizontally across it. Interposed between the opaque lines are a plurality of translucent lines or areas, each of said translucent lines corresponding to a welding location on the printed circuit board. As the positioning table 109 moves in the Y direction the automatic welding sequence is initiated each time a translucent area in the program mask is encountered. After the welding cycle is completed the positioning table 109 then advances in the "Y" direction until the next translucent area is encountered. By means of an opaque tape or other opaque light blocking means, the mask can be readily adapted to any particular weld configuration by adding or removing the opaque material from the correct translucent areas. As before when a complete "Y" traverse of the positioning table has been completed, the machine is arranged to move in the "X" direction until the next sequence of leads to be welded is aligned with the welding electrodes. The movement in the "X" direction is controlled by a program strip such as shown in FIG. 3 utilizing a mechanical positioner to detect detents in a programming strip.

Figure 13:
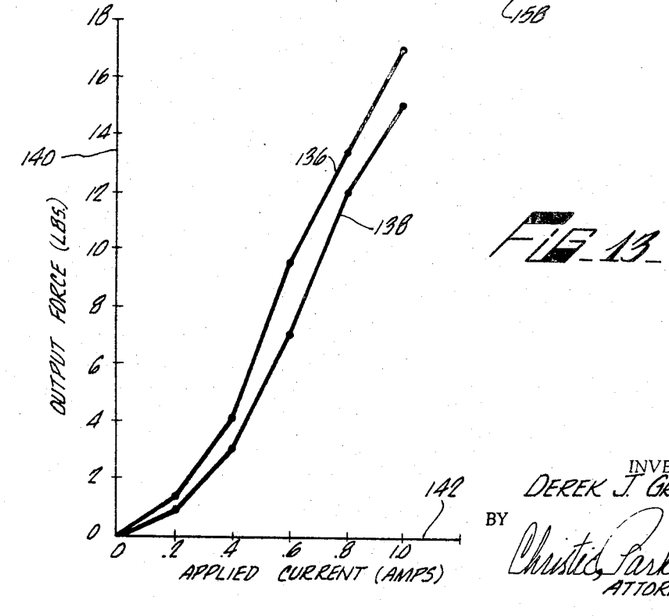
FIG. 13 is a characteristic curve depicting the operation of the force transducer.

As in the previously described embodiment, the positioning table is adapted to move in the "X" and "Y" directions along twin ball-bearing raceways 120 and 122, respectively. In the configuration shown in FIGS. 9 and 10, the roller electrodes of the previous embodiment have been replaced by straight electrodes 124. Both embodiments are readily adaptable to use with either type of electrodes. A force transducer 126 is mounted on top of the weld head 104. The force transducer which will be described in greater detail in conjunction with FIGS. 11 to 13 is a device for increasing the force exerted by the electrodes on the leads to be connected after initial contact between the leads and the electrodes has been established.

Mounted on the weld head adjacent force transducer 126 is an impulse pump 128. A line of tubing 130 extends from the pump to a position between the welding electrodes 124. The tubing is connected to the pump 128 and to a reservoir of liquid 129 such as alcohol and is adapted to deliver a small charge of such liquid to the weld location just prior to energization of the electrodes. Operation of the pump is controlled by a pump stroke control 131. Wetting of the weld location has a dual function. It insures a consistent electric contact at the weld. It also provides a heat sink which tends to prevent the epoxy on the printed circuit board from boiling up and fouling the welding electrodes and thereby provides a commensurate reduction in the need to interrupt machine operation to remove the electrodes for cleaning or replacement.

Figures 11, 12:
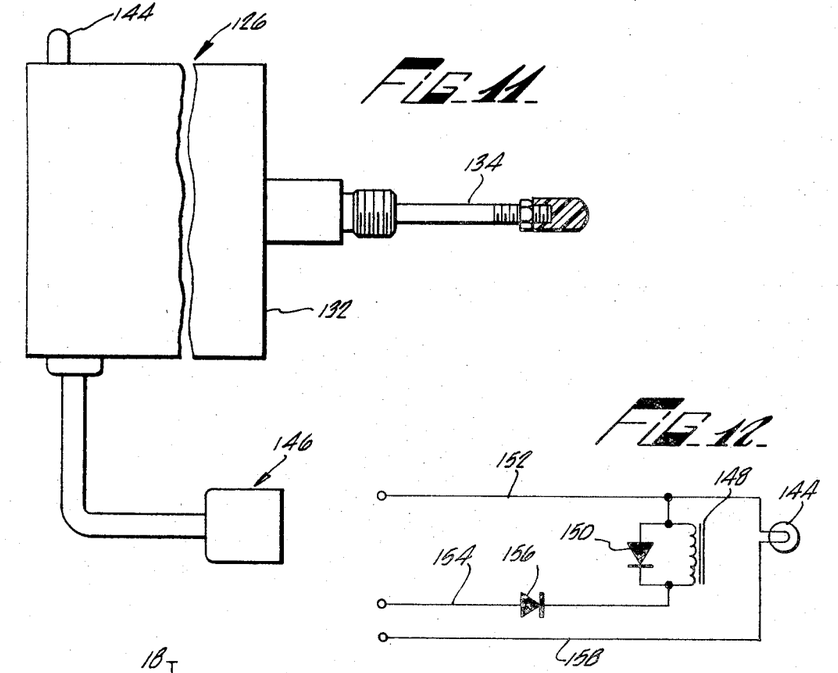
FIG. 11 is a side view of a typical force transducer.
FIG. 12 is a schematic diagram of a force transducer.

In FIG. 11 is shown a force transducer such as that shown at 126 in FIGS. 9 and 10. In essence the force transducer 126 is a solenoid encased in a housing 132 having a relatively long plunger 134 extending therefrom. The device is designated a transducer because of its capability of translating electric energy into mechanical energy. As shown in the graph of FIG. 13, the operating characteristic curve of the force transducer, the transducer provides a force which is proportional to the current applied to the solenoid. Output force is plotted along the ordinant 140 and the current applied to the solenoid along the abscissa 142. Characteristic 136 shows the maximum force exerted by the transducer and characteristic 138, the minimum force. As the graph in FIG. 13 depicts, the output force of the transducer is approximately a straight line function of the applied current. In this way the force to be exerted by the welding electrodes on the lead can be controlled by setting the current to be applied to the solenoid. The transducer has the further characteristic that the force exerted by the plunger 134 is relatively constant over substantially the entire length of the plunger travel.

A lamp 144 is provided on the transducer housing to indicate when the transducer is in operation. Power is supplied to the transducer by means of connector 146.

An electrical schematic of the force transducer is shown in FIG. 12. The solenoid 148 of the transducer is connected in parallel with a diode 150. Power to the solenoid is supplied over lead 154 through a second diode 156. A second lead 158 is connected to one side of the lamp 144 and the opposite sides of the solenoid and lamp are connected to return lead 152.

Figure 14:
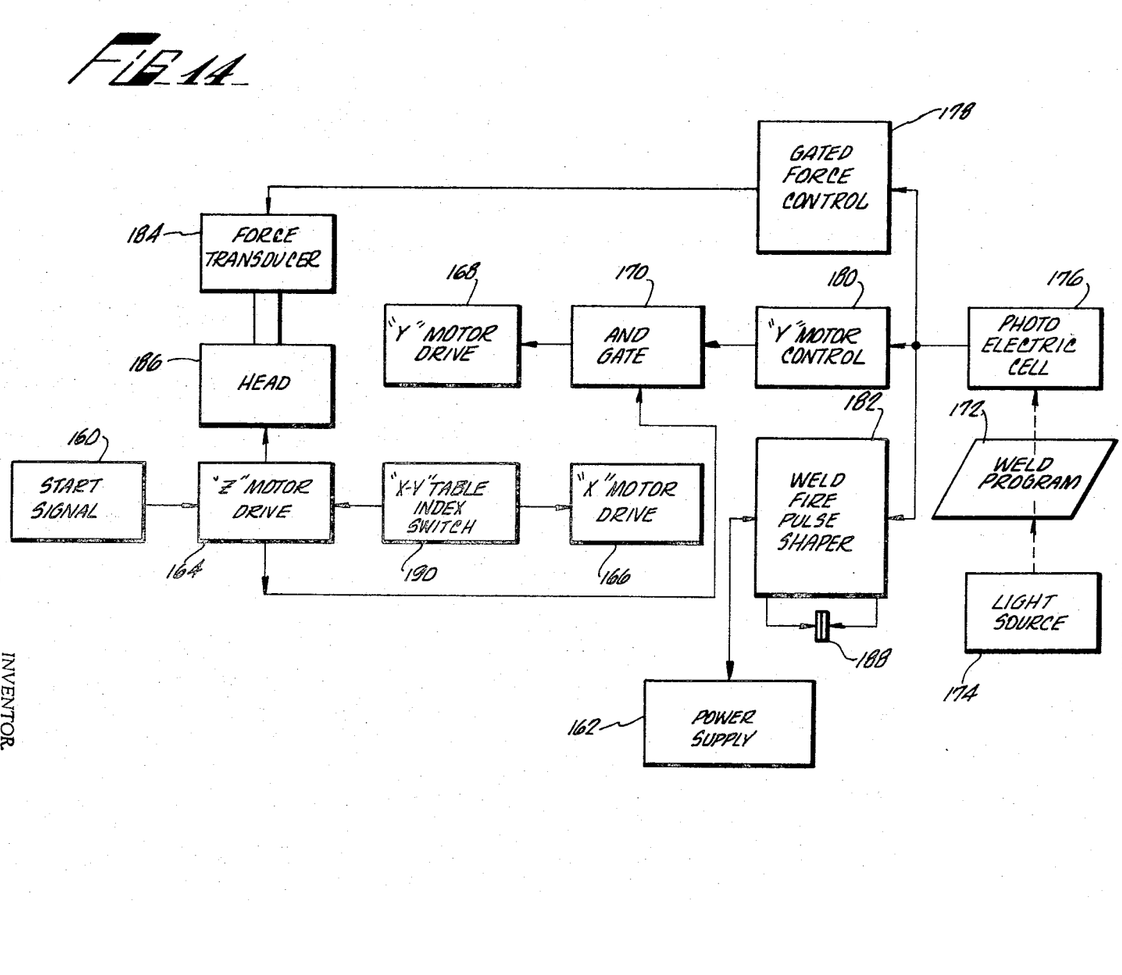
FIG. 14 is a block diagram of the welding system of FIGS. 9 and 10.

The sequence of operation of the embodiment shown in FIGS. 9 and 10 can be illustrated in conjunction with the block diagram of FIG. 14. Initially power is supplied to the welding machine by means of a start signal 160 which energizes a welding power supply 162 and the various motors required to drive the welding electrodes and the positioning table. The motor to drive the welding electrodes is the "Z" motor drive 164 while the motors to drive the positioning table are the "X" motor drive 166 and the "F" motor drive 168. The sequence of operations of the photoelectrically programmed embodiment will be described in terms of a machine utilizing the roller electrode configuration.

Typically the sequence starts at the upper left hand corner of a printed circuit board. The "Z" motor drive 164 lowers the roller electrodes into contact with the board in response to start signal 160. With the roller electrodes in position, a signal is transmitted to gate 170 which in turn transmits a signal to the "Y" drive motor 168 causing the positioning table to advance in the positive or negative "Y" direction. Travel of the positioning table causes the weld program 172 to move relative to light source 174. When a translucent portion of the weld program is positioned over the light source 174, light is transmitted therethrough to a photoelectric cell 176 and a signal is transmitted from the cell to gated force control 178, "Y" motor control 180 and weld fire pulse shaper 182. The signal to motor control 180 in turn caues an output to gate 170 causing motor drive 168 to stop with the electrodes centered on the lead to be welded. When the table has stopped and settled, the signal to force control 178 generates a signal to force transducer 184 causing the transducer to operate thereby increasing the pressure exerted by weld head 186 on the electrodes and in turn on the component leads until optimum welding pressure is achieved. The signal to the pulse shaper 182 causes an electric circuit to power supply 162 to be completed and a pulse of electrical energy is supplied from supply 162 to the pulse shaper. As in the previously described embodiment, the power supply and pulse shaper combination incorporates circuitry which automatically maintains the proper voltage amplitude on the welding pulse and adjusts the pulse duration during the weld cycle. A pulse is then delivered to welding electrodes 188 to perform the weld.

Upon completion of the welding cycle the machine is sequenced to release the pressure exerted by the force transducer and to reinitiate the "Y" motor drive causing the components to be welded and the welding program mask to travel until the next translucent portion of the weld program is encountered. Upon completion of the traverse of the electrodes across the board, the "X-Y" table index switch 190 is energized. When energized index switch 190 generates a signal transmitted to the "Z" motor drive 164 and to the "X" motor drive 166. The signal to the "Z" motor drive causes the electrodes to be raised and the signal to the "X" motor drive causes the positioning table to move in the "X" direction until the next line of welds is brought into alignment with the welding electrodes. The "Z" motor drive is then re-energized lowering the electrodes into contact with the printed circuit board preparatory to running another line of welds.

The preceding sequence of operation was described in terms of a machine utilizing a roller electrode configuration. In those cases where the straight electrode configuration is used, a mechanical modification is made by means of a spring in the weld head which biases the electrode supports to provide a small amount of spacing between the electrodes and the connection point. Operation of the force transducer overrides the spring bias causing the electrodes to contact the connection point. Operation then proceeds as previously described. When the transducer is relased, the spring bias again comes into play causing the electrode to clear the printed circuit board allowing the machine to travel and position the next connection point beneath the electrodes. When the welds on the board have been completed, the "X–Y" table index switch 190 is provided with a stop contact which when energized raises the electrodes from the board, moves the positioning table to a loading position and shuts the machine off.

While the machine of this invention has been described in conjunction with a circuit board to which one or more micro-circuit or integrated circuit flat packs are to be resistance welded, it is to be understood that various types of components are capable of being electrically connected by means of this invention, both by means of welding and also by reflow soldering. Likewise, the apparatus has been shown as having only one weld head. There is no inherent limitation in the invention which prevents the use of a plurality of heads and a plurality of work tables all being supplied with control actuations by a common set of motors, etc.

What is claimed is:

1. Apparatus for welding leads of electronic components comprising:
   a work table,
   a welding power supply mounted on the work table,
   a first support mounted on the work table,
   a pair of electrodes mounted on the first support, the electrodes being electrically connected to the power supply,
   a second support for the components, said second support being mounted on the work table,
   means for establishing electrical contact between the electrodes and the component leads to be welded,
   means for moving the second support and electrodes relative to one another in a first direction,
   means for moving the second support and electrodes relative to one another in a second direction,
   photoelectric programming means for controlling the relative movement of the electrodes and the second support responsive to detection of a predetermined position corresponding to the presence of a lead to be welded adjacent the electrodes, and
   means mounted on the work table for controlling the force exerted by the electrodes on the component leads to be welded and subsequently the transmission of a pulse of welding energy from the power supply to the electrodes after a predetermined pressure is exerted by the electrodes on a lead to be welded.

2. Apparatus according to claim 1 wherein the means for establishing electrical contact between the electrodes and the component leads to be welded include means for moving the electrodes vertically with respect to the second support.

3. Apparatus according to claim 2 wherein the photoelectric programming means comprises:
   a light source,
   photocell means disposed opposite the light source, and
   mask means mounted on the second support between the source and the photocell means for controlling the transmission of light from the source to the photocell to control the movement of the electrodes relative to the second support and the transmission of welding energy to the electrodes.

4. Apparatus according to claim 3 including means for adjusting the amount of force exerted by the electrodes on a lead to be welded subsequent to establishing electrical contact between the electrodes and the lead.

5. Apparatus according to claim 4 including means mounted on the work table for delivering a charge of liquid to the weld location approximately at the time of transmission of energy to the electrodes.

6. Apparatus according to claim 5 wherein the liquid charge delivering means comprises:
   a liquid reservoir, and
   impulse pump means for delivering a quantity of liquid from the reservoir to the weld location responsive to a signal from said programming means.

7. Apparatus according to claim 6 wherein the liquid in said reservoir is alcohol.

8. Apparatus according to claim 7 including means associated with each of the pair of electrodes for compensating for variations in the dimensions of the wire leads and circuit board.

9. Apparatus according to claim 8 including means for sensing the weld condition and for supplying an electric power pulse having an amplitude and duration responsive to the condition sensed.

10. Apparatus for welding wire leads from an electronic component to connection points on a printed circuit board upon which the electronic component is disposed, comprising:
    a work table,
    a welding power supply mounted on the work table,
    a first support mounted on the work table,
    a pair of roller electrodes mounted on the first support, the pair of electrodes being electrically connected to the power supply and being disposed relative to one another such that a current gap is defined therebetween,
    a second support mounted on the work table, the printed circuit board and component being disposed thereon,
    means for moving the second support and roller electrodes relative to one another in a first direction,
    means for moving the second support and roller electrodes relative to one another in a second direction transverse to the first direction to sequentially contact the electrodes to the component leads, contact with a component lead closing an electric circuit across the current gap,
    photoelectric programming means for controlling the relative movement of the electrodes and the second support,
    means responsive to the programming means for increasing the force exerted by the electrodes on the lead to obtain proper welding pressure on the lead and connection point, and
    means responsive to the programming means for supplying power from the welding power supply to the roller electrodes to cause a welding current pulse to flow through the closed current gap when contact at the proper welding pressure has been established between the electrodes and the lead.

11. Apparatus for welding the wire leads of an electronic component to connection points on a work piece with which the component is associated comprising:
    a welding power supply,
    a pair of supports electrically connected to the power supply,
    an electrode mounted on each of the supports each electrode being electrically connected to the support, the pair of electrodes being disposed from the supports such that they define a current gap therebetween,
    means associated with each of the electrodes for compensating for variations in the dimensions of the wire leads and work piece,
    a work table on which the work piece and component are disposed,
    means for moving the work table horizontally relative to the electrodes in a first direction,
    means for moving the table horizontally relative to the electrodes in a second different direction from said first direction of horizontal motion,
    means for moving the electrodes vertically with respect to the table for electrically contacting the electrodes and a lead to be welded,
    position detecting program means for controlling the relative movement of the electrodes and the work table responsive to the detection of a predetermined point corresponding to a lead to be welded,
    means for adjusting the force exerted by the electrodes on the lead to obtain proper welding pressure on the lead and connection point and to control the transmission of electrical energy to the electrodes from the power supply subsequent to establishing contact between the electrodes and a lead to be welded, means for limiting an electrical pulse from the power supply to a proper amplitude and duration to obtain optimum welding of the lead to the connection point, adjustable indexing means for controlling the table travel in said second direction, means for reversing the direction of travel of the table in said first direction, and means for stopping operation of the apparatus when welding is completed.

12. Apparatus for connecting leads of electronic components comprising:

a work table, a power supply mounted on the work table, a first support mounted on the work table, a pair of electrodes mounted on the first support, the electrodes being electrically connected to the power supply, a second support for the components, said second support being mounted on the work table, means for establishing electrical contact between the electrodes and the component leads to be connected, means for moving the second support and electrodes relative to one another in a first direction, means for moving the second support and electrodes relative to one another in a second direction, adjustable programming means mounted on the work table for detecting a predetermined position corresponding to the location of a lead to be connected in proper position relative to the electrodes, transducer means mounted on the work table for adjusting the amount of force exerted by the electrodes on a lead to be connected subsequent to establishing contact between the electrodes and the lead and for controlling the transmission of energy from the power supply to the electrodes, and means for supplying an electric power pulse having an amplitude and duration responsive to the electric parameters at the point of contact between the electrodes and the leads to be connected.

References Cited
UNITED STATES PATENTS

| | | | |
|---|---|---|---|
| 2,312,938 | 3/1943 | Stieglitz | 219—89 |
| 2,313,941 | 3/1943 | Humphrey et al. | 219—89 |
| 2,356,643 | 8/1944 | Allshouse et al. | 219—102 |
| 2,472,368 | 6/1949 | Cox et al. | 219—86 |
| 2,787,700 | 4/1957 | Kalbow | 219—79 X |
| 3,029,348 | 4/1962 | Heinz | 250—221 |
| 3,109,921 | 11/1963 | Anderson | 219—125 |
| 3,207,904 | 9/1965 | Heinz | 250—222 X |

RICHARD M. WOOD, *Primary Examiner.*

B. A. STEIN, *Assistant Examiner.*